Figure 1:
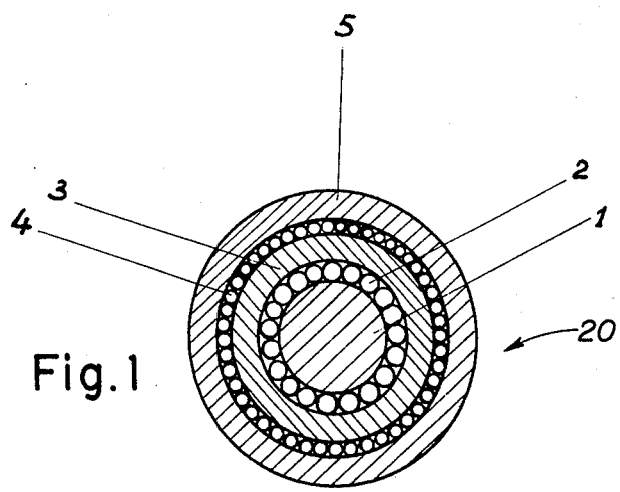

United States Patent [19]
Invernizzi

[11] 3,919,956
[45] Nov. 18, 1975

[54] LIGHTNING PROTECTION INSTALLATION
[76] Inventor: Cesare G. Invernizzi, 14 bis Avenue Dumas, Geneva, Switzerland
[22] Filed: Mar. 14, 1972
[21] Appl. No.: 234,614

[30] Foreign Application Priority Data
Mar. 18, 1971 Switzerland.......................... 3961/71

[52] U.S. Cl..................... 114/.5 R; 174/2; 174/6; 244/1 A
[51] Int. Cl.².................. B63B 35/00; H02G 13/00
[58] Field of Search............ 244/1 A; 317/2 D, 2 E, 317/2 F; 114/.5 R, .5 F; 174/2, 3, 6, 4 C, 102 R, 107, 131 A

[56] References Cited
UNITED STATES PATENTS

| | | |
|---|---|---|
| 369,915 | 9/1887 | Brown................................ 174/6 X |
| 1,290,881 | 1/1919 | Becker................................... 174/7 |
| 2,025,338 | 12/1935 | Capart................................ 174/4 C |
| 2,531,183 | 11/1950 | Wisner................................. 174/6 |
| 2,909,589 | 10/1959 | Booker................................ 174/6 |
| 3,541,221 | 11/1970 | Aupoix et al. .................. 174/108 X |
| 3,617,805 | 11/1971 | Truax................................. 317/2 E |

Primary Examiner—Robert R. Song
Assistant Examiner—Gene A. Church
Attorney, Agent, or Firm—Wenderoth, Lind & Ponack

[57] ABSTRACT

A lightning rod is grounded by the inner conducting core of a coaxial cable having a grounded outer conducting sheath separated from said core by an insulating layer.

4 Claims, 2 Drawing Figures

LIGHTNING PROTECTION INSTALLATION

The present invention relates to installations for lightning protection, for example for buildings and boats.

Since the invention of the lightning rod by Benjamin Franklin, efforts with a view to improving lightning protection have been directed to the improvement of ionizing means, leading to the use of radioactivity, by means of which the captor components or rods of certain modern lightning protection systems have reached what can be considered as a perfect and permanent efficiency. But this only emphasises the weak point in every lightning protection system, namely the dangers in transporting the captured discharge from the lightning rod down to ground.

The norms specified for the lightning protection of boats mention the dangers in the grounding of lightning along a bare cable passing close to other cables and metallic structures, due to sparking or even a transfer of the charge itself to these other cables or metallic structures.

These dangers also occur in buildings. Cables, television antenna downleads and other conducting components are frequently concentrated in narrow channels through which it is also necessary to pass the lightning rod grounding cable.

One must also examine the so-called influencing phenomena produced during the transport of lightning between the rod and ground. These phenomena may perturb the functioning of important elecronic or electrical installations and even cause them to break down, especially telcommunications installations on boats.

Finally one must bear in mind the ageing of grounding components in lightning protection installations, the electrical resistance of which can become much greater than that of other installations or nearby structures, which has on frequently recorded occasions led to important damage.

A knowledge of these dangers acquired through a long experience and a thorough examination of the international maritime norms on lightning protection have led the originator of the present invention to search and find a solution eliminating all of the aforementioned inconveniences.

According to the invention, a lightning protection installation comprises a rod-grounding conductor formed by a conducting core of a shielded coaxial cable comprising an outer conducting sheath insulatingly separated from said core, said sheath also being grounded.

FIG. 1 of the accompanying drawings is a cross section through an embodiment of a grounding conductor of a lightning protection installation according to the invention, given by way of example.

Figure 2:
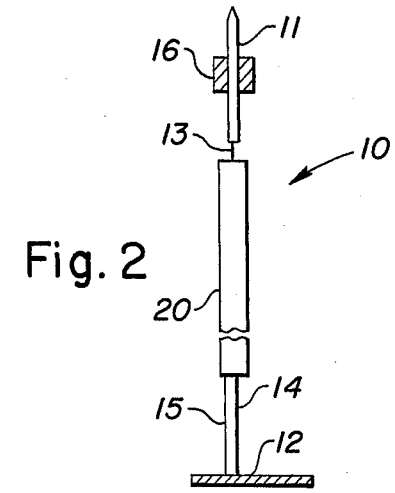

FIG. 2 is a schematic representation of a lightning protection installation employing the conductor of FIG. 1.

The lightning protection installation comprises a lightning rod fixed on the upper part of a structure and connected to a ground-plate 12 by a conductor 20 constituted by the conducting core of a sheathed or coaxial cable including a central insulating core 1 in plastic material, 9.3. mm in diameter for example. The central core 1 is surrounded, in this example, by said conducting core 2 constituted of a cable made up of copper wires each 1.38 mm in diameter, the core 2 having an exterior diameter of 12.1 mm. This core 2 is surrounded by an intermediate insulating layer 3 which can be of polyvinyl chloride with an exterior diameter of 17.3 mm. Around this layer 3 is placed a conducting casing 4 constituting the electrical sheathing and made up of 54 copper wires each 0.90 mm in diamter, the casing 4 having an outer diameter of 19.1 mm and being covered by an insulating exterior cover 5, for example in polyvinyl chloride and with an outer diameter of 24.2 mm.

The conducting core 2 is connected at its upper end to the lighning rod (as schematically represented by 13 in FIG. 2) and at its lower end to a ground-plate (as schematically represented by 14 in FIG. 2). The conducting casing 4 is also connected at its lower end to a ground-plate (as schematically represented by 15 in FIG. 2), which can be the same as that of the core 2. This conducting casing 4, as well as the insulating central core 1 and the two insulating layers 3 and 5, encase the conducting core 2 along its entire length between the base of the lightning rod and the ground-plate.

During the conduction of lightning from the rod to ground by the core 2, the presence of the conducting casing 4 prevents sparking, transfer of the charge, and influencing effects between the core 2 and nearby electrical installations and metallic structures, thereby ensuring a total protection of the latter.

The described installation is particularly useful for the protection of boats. To provide a ground-plate on boats, the maritime norms forsee the fixing of a copper plate on the hull, said plate having a surface area of from 0.5 to 2 m². It is always difficult and sometimes even impossible to secure such a plate in a satisfactory manner, particularly for balanced wood hulls, or hulls of plastic or with a false bottom. In addition, problems arise due to vegetal and animal proliferations and to other degradations which can occur to such a ground-plate, causing it to dangerously lose its efficiency. For these reasons, the ground-plate for the core 2 and the casing 4 is provided, in the described installation when used for the protection of a boat, by connecting the conducting core 2 and the conducting casing 4 of the sheathed conductor or coaxial cable to the rudder or the propellor of the boat, or to both. Experience has proven the advantage of such a ground-plate relative to conventional plates.

The installation preferably comprises radioactive sources (such as schematically represented by 16 in FIG. 2) fixed around the point of the lightning rod, for example Am-241 sources, so as to maintain a powerful ionization around the lightning rod, thereby ensuring the efficiency of the latter.

What is claimed is:

1. In a lightning protection installation including a lighting rod, a ground, and a conductor operatively attached to and extending between said lightning rod and said ground for grounding said lightning rod, the improvement wherein:

said conductor comprises a conductor core connected to said lightning rod and to said ground; an outer conducting sheath coaxially surrounding said conductor core and extending along substantially the entire length thereof, said outer conducting sheath being connected to said ground and; insulating means between said conductor core and said outer conducting sheath and extending the entire length of said outer conducting sheath.

2. The improvement claimed in claim 1, wherein said conductor further comprises a central insulating core located centrally of said conductor core, an intermediate insulating layer separating said conductor core and said outer conducting sheath, and an exterior insulating cover covering said outer conducting sheath.

3. The improvement claimed in claim 1, wherein said installation further comprises a radioactive ionizing source positioned in the vicinity of the point of said lightning rod.

4. The improvement claimed in claim 1, wherein said installation is positioned on a boat, and said conductor core and said outer conducting sheath are connected to a ground plate formed by the rudder and/or propeller of said boat.

* * * * *